United States Patent [19]
Chiao et al.

[11] Patent Number: 6,146,328
[45] Date of Patent: *Nov. 14, 2000

[54] METHOD AND APPARATUS FOR ULTRASONIC BEAMFORMING USING GOLAY-CODED EXCITATION

[75] Inventors: Richard Yung Chiao, Clifton Park, N.Y.; Lewis Jones Thomas, III, Tokoyo, Japan

[73] Assignee: General Electric Company, Schenectady, N.Y.

[ * ] Notice: This patent is subject to a terminal disclaimer.

[21] Appl. No.: 09/255,684

[22] Filed: Feb. 23, 1999

[51] Int. Cl.$^7$ .................................................. A61B 8/00
[52] U.S. Cl. ............................................. 600/443; 600/447
[58] Field of Search ................................. 600/437, 443, 600/447, 454–456; 73/625–626; 367/7, 11, 138

[56] References Cited

U.S. PATENT DOCUMENTS

5,014,712   5/1991   O'Donnell  ............................. 600/447
5,984,869  11/1999   Chiao et al. ............................. 600/437

*Primary Examiner*—Franics J. Jaworski
*Attorney, Agent, or Firm*—Marvin Snyder; Douglas E. Stoner

[57] ABSTRACT

A method and apparatus for improving the SNR in medical ultrasound imaging utilize Golay-coded excitation of the transducer array. A Golay pair is a pair of binary (+1,−1) sequences with the property that the sum of the autocorrelations of the two sequences is a Kronecker delta function. This translates into two important advantages over codes in general: (1) Golay codes have no range sidelobes, and (2) Golay codes can be transmitted using only a bipolar pulser versus a more expensive digital-to-analog converter. Degradation of the Golay code is avoided by employing multiple focal zones, where the Golay code is used only in the deepest focal zones in order to minimize dynamic focusing effects, and by employing two consecutive transmits on each beam to minimize tissue motion between the two code sequences.

22 Claims, 4 Drawing Sheets fig. 1
PRIOR ART fig. 2
PRIOR ART fig. 3 fig. 4 fig. 5 fig. 6 fig. 7 fig. 8 fig. 9 fig. 10

METHOD AND APPARATUS FOR ULTRASONIC BEAMFORMING USING GOLAY-CODED EXCITATION

FIELD OF THE INVENTION

This invention generally relates to ultrasound imaging systems and, more particularly, to methods and apparatus for increasing the signal-to-noise ratio (SNR) in medical ultrasound imaging.

BACKGROUND OF THE INVENTION

Conventional ultrasound imaging systems comprises an array of ultrasonic transducer elements which transmit an ultrasound beam and then receive a reflected beam from the object being studied. This operation comprises a series of measurements in which a focused ultrasonic wave is transmitted, the system switches to receive mode after a short time interval, and the reflected ultrasonic wave is receive, beamformed and processed for display. Transmission and reception are typically focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delays (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. Resolution of a scan line is a result of the directivity of the associated transmit and receive beam pair.

The output signals of the beamformer channels are coherently summed to form a respective pixel intensity value for each sample volume in the object region or volume of interest. These pixel intensity values are log-compressed, scan-converted and then displayed as an image of the anatomy being scanned.

In medical ultrasound imaging systems of the type described hereinabove, it is desirable to optimize the SNR. Additional SNR can be used to obtain increase penetration at a given imaging frequency or to improve resolution by facilitating ultrasonic imaging at a higher frequency.

The use of Golay code in ultrasound is well known in the area of non-destructive evaluation (NDE) using single-element fixed-focus transducers to inspect inanimate objects. Golay code is also known in the medical ultrasound imaging community. However, the use of Golay code in an ultrasound imaging system of the type described above has been dismissed because dynamic focusing, tissue motion (effects not present in NDE) and nonlinear propagation effects are thought to cause unacceptable code degradation with corresponding range degradation.

SUMMARY OF THE INVENTION

The present invention is a method and apparatus for improving the SNR in medical ultrasound imaging by using Golay-coded excitation of the transducer array without unacceptable degradation of the Golay code. Code degradation is avoided by employing multiple focal zones, where the Golay code is used only in the deepest focal zones in order to minimize dynamic focusing effects and nonlinear propagation effects. Golay code is not used in the shallow zones where there is adequate SNR. Code degradation due to tissue motion during the interval between two transmit firings has been found to be acceptable.

The SNR is improved by transmitting a pair of Golay-encoded base sequences consecutively on each beam at the same focal position and then decoding the beamsummed data. The imaging depth is divided into multiple focal zones, with coded excitation used only for the deepest focal zone (s). The deepest zones have the largest f-numbers, which result in the least code distortion due to dynamic focusing. In addition, the deepest zones have a need for SNR improvement.

A pair of Golay-encoded base sequences are formed by convolving a base sequence with a Golay code pair after oversampling. A Golay code pair is a pair of binary (+1, −1) sequences with the property that the sum of the autocorrelations of the two sequences is a Kronecker delta function. An oversampled Golay sequence is the Golay sequence with zeroes in between each +1 and −1, the number of zeroes being greater than or equal to 1 less than the length of the base sequence.

The aforementioned property of Golay code pairs translates into two important advantages over codes in general: (1) Golay codes have no range sidelobes, and (2) Golay codes can be transmitted using only a bipolar pulser versus a more expensive digital-to-analog converter.

By transmitting two sequences of pulses that are polarity-encoded according to a Golay pair, the correlation of each of the received beamsum signals with its corresponding oversampled Golay sequence and the summation of those correlations enables an increase in the SNR with virtually no degradation in image resolution or contrast. In practice, range sidelobes do occur due to code distortion, but they tend to be below the noise floor (which can be quite high in the deep focal zones) and do not adversely affect image quality.

Nonlinear propagation effects distort the code at high signal amplitude. However, the signal amplitude is low in deep zones. Although a nonlinear signal generated in shallow zones continues to propagate, such signals have higher frequencies, i.e., harmonics or multiples of the fundamental frequency, so they attenuate at a higher rate than does the fundamental frequency. At deeper focal zones, nonlinear signals generated earlier have substantially died out. Thus, by using the Golay code only in deep zones—where nonlinear propagation effects are small—code distortion is avoided.

Tissue motion that occurs in the interval between transmission of the two sequences of the Golay pair also causes code distortion which increases the range sidelobes. By transmitting the second sequence as soon as the echoes from the first sequence have been completely received, duration of the interval between the two transmits can be minimized. Minimization of the interval between transmits in turn minimizes the motion-induced code distortion.

DETAILED DESCRIPTION OF THE PREFERRED EMBODIMENTS

Figure 1:
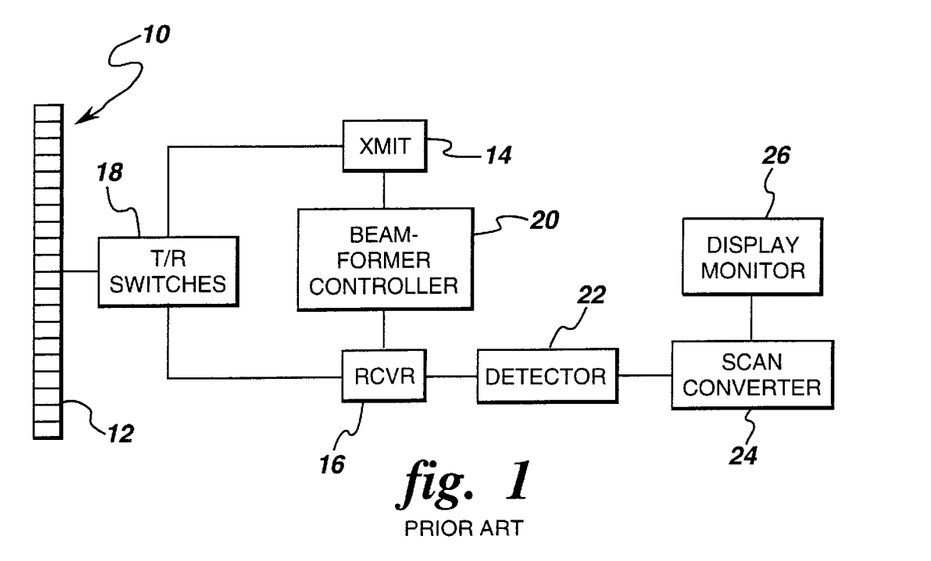
FIG. 1 is a block diagram showing the major functional subsystems within a conventional real-time ultrasound imaging system.

FIG. 1 illustrates a conventional ultrasonic imaging system incorporating a transducer array 10 comprised of a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. The T/R switches 18 are typically diodes which protect the receive electronics from the high voltages generated by the transmit electronics. The transmit signal causes the diodes to shut off or limit the signal to the receiver. Transmitter 14 and receiver 16 are operated under control of a beamformer controller 20 responsive to commands by a human operator. A complete scan is performed by acquiring a series of echoes in which transmitter 14 is gated ON momentarily to energize each transducer element 12, and the subsequent echo signal produced by each transducer element 12 are applied to receiver 16. A transducer element may be actuated to begin reception while another transducer element is still transmitting. Receiver 16 combines the separate echo signals from each transducer element to produce a single echo signal which is used to produce a line in an image on a display monitor 28.

Under the direction of beamformer controller 20, transmitter 14 drives transducer array 10 such that the ultrasonic energy is transmitted as a directed focused beam. To accomplish this, respective time delays are imparted to a multiplicity of pulsers 28, shown in FIG. 2. Each pulser is coupled to a respective transducer element via T/R switches 18. The transmit focus time delays are preferably read from a look-up table 30. By appropriately adjusting the transmit focus time delays in a conventional manner, the ultrasonic beam can be directed and focused at a point.

The echo signals produced by each burst of ultrasonic energy reflect from objects located at successive ranges along the ultrasonic beam. The echo signals are sensed separately by each transducer element 12, shown in FIG. 1, and a sample of the echo signal magnitude at a particular point in time represents the amount of reflection occurring at a specific range. Due to differences in the propagation path between a reflecting point and each transducer element 12, however, these echo signals will not be detected simultaneously and their amplitudes will not be equal. Receiver 16 amplifies the separate echo signals, imparts the proper time delay to each, and sums them to provide a single echo signal which accurately indicates the total ultrasonic energy reflected from a specific point located at a particular range along the ultrasonic beam.

Figure 2:
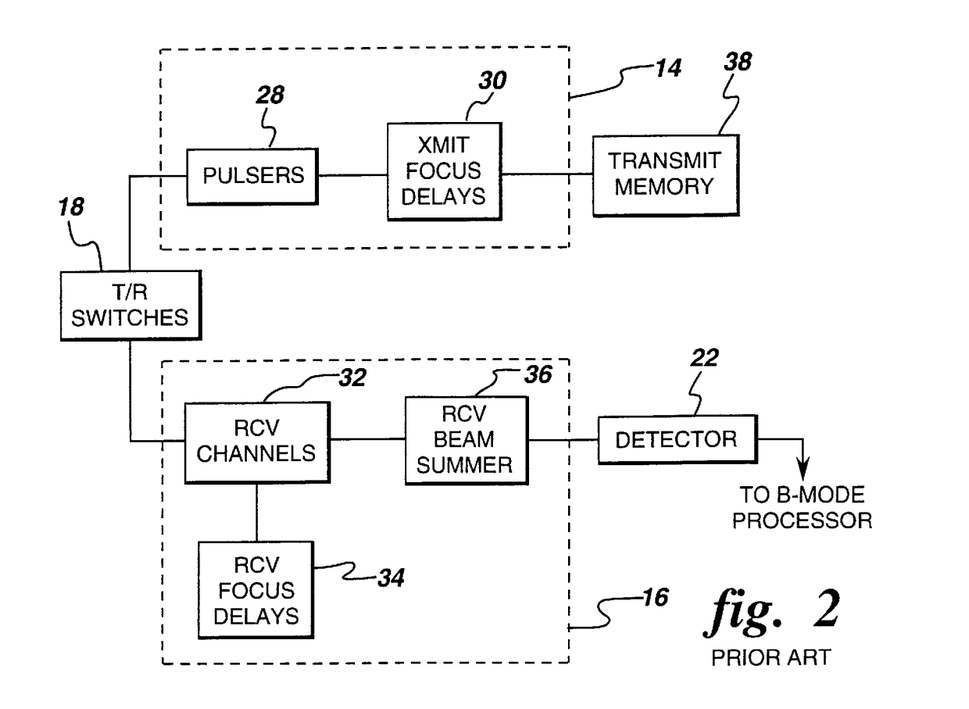
FIG. 2 is a block diagram showing further details of the pulsing and receiving subsystems incorporated in the system depicted in FIG. 1.

Under the direction of beamformer controller 20, as shown in FIG. 1, receiver 16 tracks the direction of the transmitted beam and acquires the echo signals at a succession of ranges. Each transmission of an ultrasonic pulse waveform results in acquisition of data which represents the amount of sonic energy reflected from corresponding ranges along the ultrasonic beam. To accomplish this, respective receive focus time delays are imparted to a multiplicity of receive channels 32 of receiver 16, as shown in FIG. 2. Each receive channel is coupled to a respective transducer element via T/R switches 18. The receive focus time delays are computed in real-time using specialized hardware 34 or read from a look-up table. The receive channels include circuitry (not shown) for apodizing and filtering the received pulses. The time-delayed receive signals are then summed in a receive summer 36.

A signal processor or detector 22 converts the summed received signal to display data. In the B-mode (grey-scale), this constitutes the signal envelope with some additional processing, such as edge enhancement and logarithmic compression. A scan converter 24, shown in FIG. 1, receives the display data from detector 22 and converts the data into the desired image for display. In particular, scan converter 24 converts the acoustic image data from polar coordinate (R-θ) sector format or Cartesian coordinate linear array to appropriately scaled Cartesian coordinate display pixel data at the video rate. These scan-converted acoustic data are supplied for display to display monitor 26, which images the time-varying amplitude of the signal envelope as a grey scale.

Figure 3:
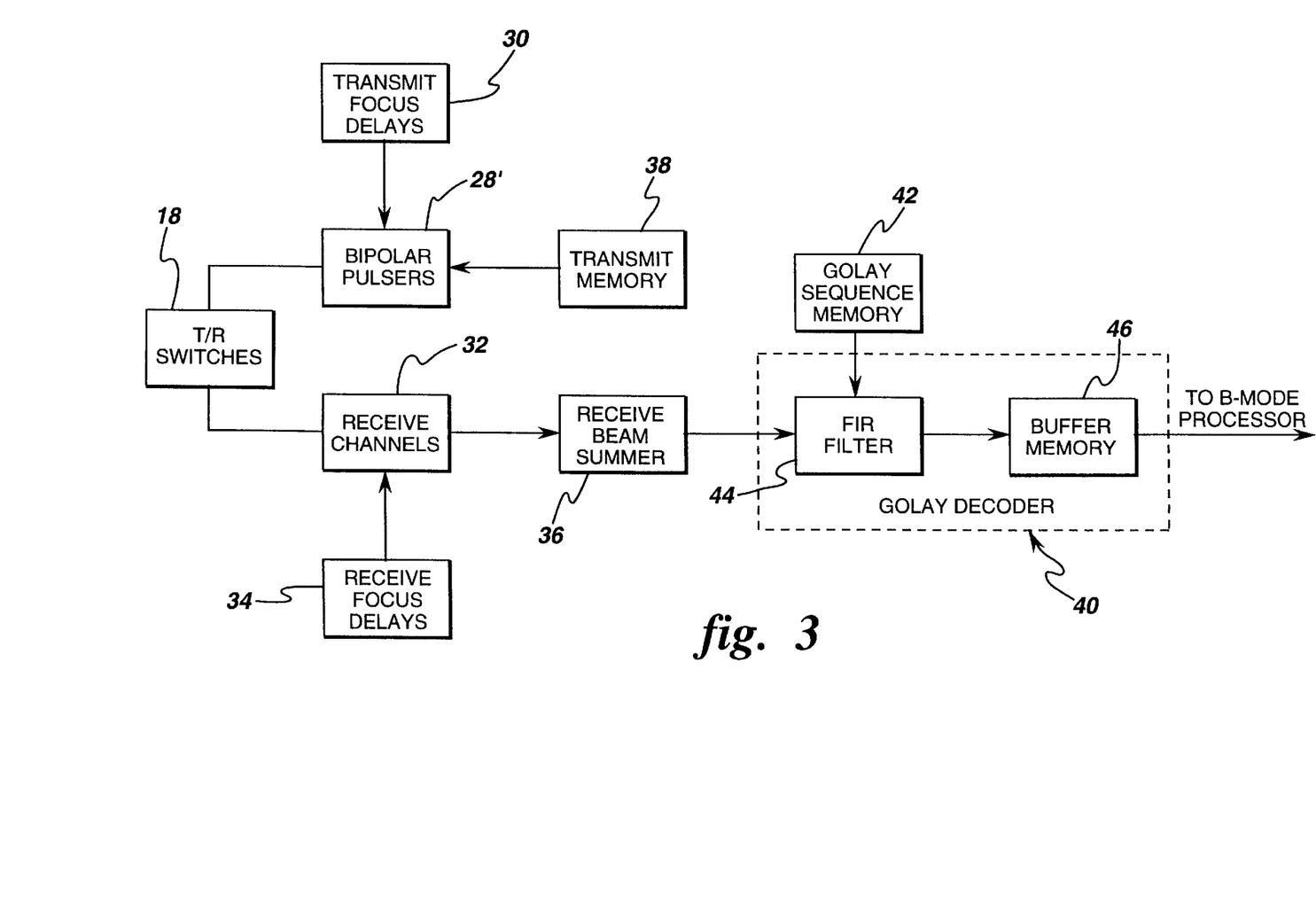
FIG. 3 is block diagram of an ultrasonic imaging system using Golay-coded excitation of transducer elements and decoding of the receive waveform in accordance with the present invention.
Figure 4:
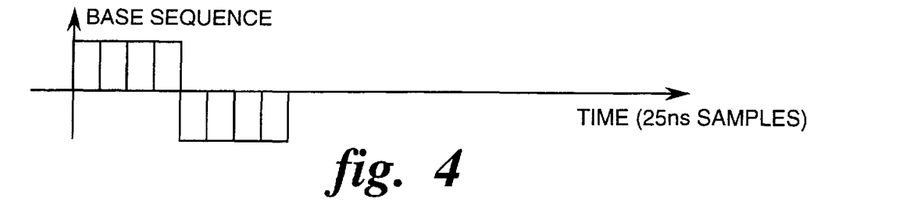
FIGS. 4, 5, 6, 7 and 8 are pulse diagrams showing the base sequence (FIG. 4), the oversampled Golay sequences (FIGS. 5 and 6), and the Golay-encoded base sequences (FIGS. 7 and 8) in accordance with one preferred embodiment of the invention.
Figure 5:
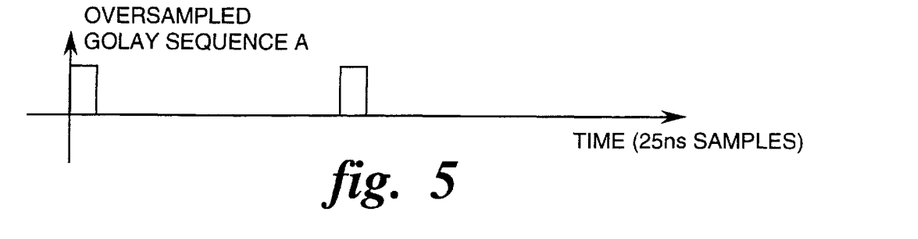

FIG. 3 is a block diagram of a medical ultrasound imaging system in accordance wit the present invention, with the beamformer controller, such as shown in FIG. 3, omitted for simplicity of illustration. The imaging system operates in conventional manner when imaging shallow transmit focal zones (which generally have adequate SNR). However, for deep transmit focal zones (which generally have inadequate SNR) the system uses Golay-encoded excitation.

Figure 9:
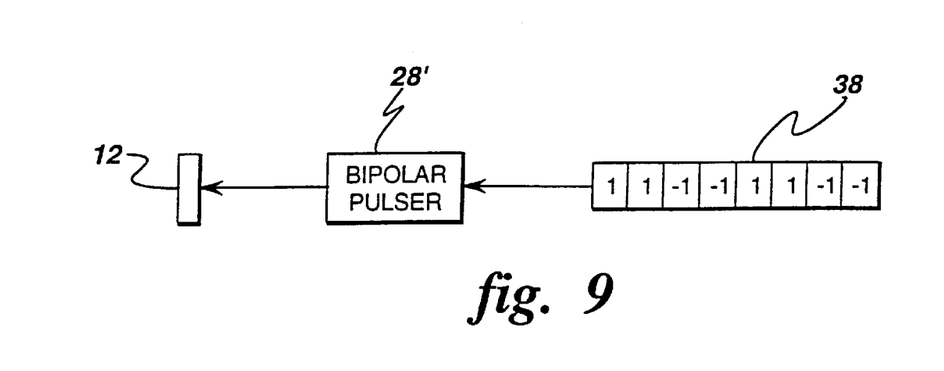
FIG. 9 is a block diagram showing the arrangement for Golay-encoded excitation of a single transducer element in accordance with the present invention.

During each firing of ultrasonic energy, bipolar pulsers 28' are excited by a Golay-encoded base sequence output signal from a transmit memory 38 or from specialized hardware. In response to the Golay-encoded base sequence from transmit memory 38 and transmit focus delays supplied from a look-up table 30, the pulsers produce Golay-encoded pulse sequences to the respective transducer elements 12 (FIG. 1), making up the transmit aperture. FIG. 9 shows one such base sequence stored in transmit memory 38 for driving a transducer element 12. The +1 and −1 elements of each Golay-encoded base sequence are transformed into pulses of opposite phase by the bipolar pulsers. A pair of Golay-encoded base sequences are transmitted consecutively on each beam, i.e., during first and second firings having the same focal position.

For each firing, the echo signals resulting from the focused beam received at the transducer elements are transduced into electrical signals by the transducer elements making up the receive aperture. These received signals are amplified and time-delayed in receive channels 32 in accordance with the receive focus time delays computed in real-time by a processor 34 or, alternatively, supplied from a look-up table (not shown). The amplified and delayed signals are summed by receive beam summer 36.

The summed receive signal is decoded by a Golay decoder 40. For each firing, decoding is performed using the oversampled Golay sequence corresponding to the Golay-encoded base sequence employed during transmission. The oversampled Golay sequences are stored in a memory 42 and are supplied to decoder 40 at the appropriate time.

In accordance with a preferred embodiment of the invention, Golay decoder 40 comprises a finite impulse response (FIR) filter 44 and a buffer memory 46 having an input coupled to the output of the FIR filter. For the first firing, a first set of filter taps are read out of Golay sequence memory 42 to FIR filter 44. The beamsummed signal produced following the first firing is the filtered and stored in buffer memory 46. For the second firing, a second set of filter taps are read out of Golay sequence memory 42 to FIR filter 44. The beamsummed signal produced following the second firing is then filtered and supplied to buffer memory 46, where the filtered beamsummed signal from the second firing is added to the filtered beamsummed signal from the first firing.

Figure 6:
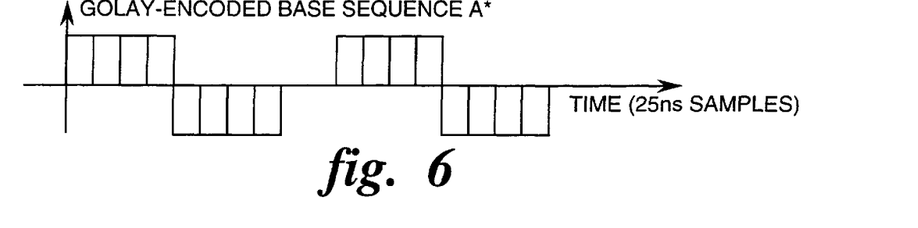
Figure 7:
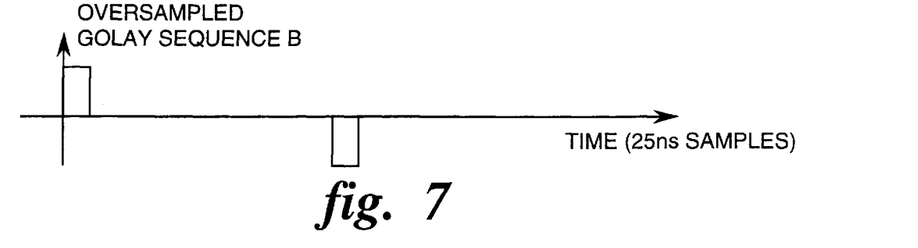
Figure 8:
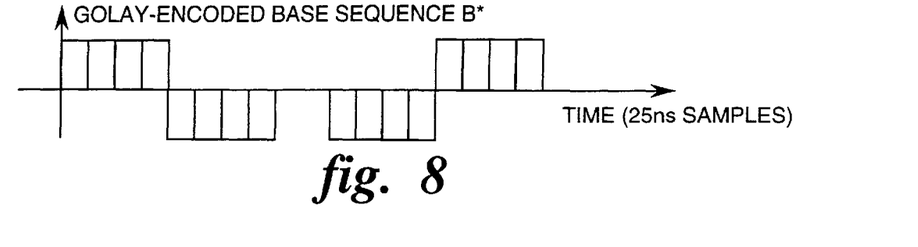

FIGS. 4–8 illustrate formation of the transmit (Golay-encoded) base sequences from the convolution of the base sequence with the respective one of a pair of oversampled Golay sequences. The base sequence is designed to optimize the resulting ultrasonic pulse shape and spectral energy. In the example depicted in FIG. 4, the base sequence is a sequence of pulses having the following polarities: [+1,+1,+1,+1,−1,−1,−1,−1]. For the first firing, the base sequence is convolved with oversampled Golay sequence A (see FIG. 5) corresponding to Golay code [+1,+1]. The resulting Golay-encoded base sequence A* is shown in FIG. 6. For the second firing, the base sequence is convolved with oversampled Golay sequence B (see FIG. 7) corresponding to Golay code [+1,−1]. The resulting Golay-encoded base sequence B* is shown in FIG. 8. The Golay-encoded base sequences are precomputed and stored in transmit memory 38, shown in FIG. 3. The transmit sequence, after exciting the transducer element, results in a sequence of ultrasonic pulses with polarity given by a Golay sequence for each firing.

Figure 10:
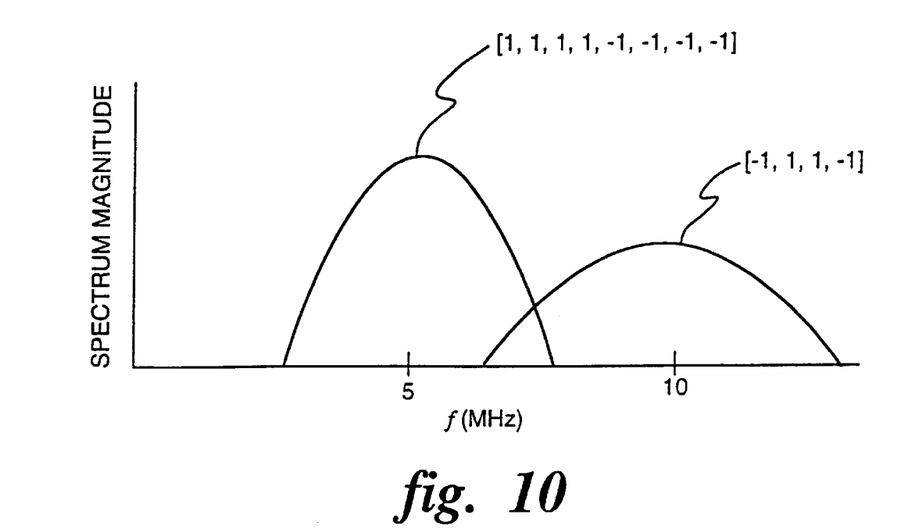
FIG. 10 is a graph of the spectrum magnitude versus frequency for the base sequence shown in FIG. 4 and for the base sequence [−1,+1,+1,−1].

The base sequence can be optimized to ensure that maximum energy passes through the transducer passband. For example, FIG. 10 shows the spectrum magnitude as a function of frequency for two base sequences: [+1,+1,+1,+1,−1,−1,−1,−1] and [−1,+1,+1,−1]. As seen in FIG. 10, assuming a sampling rate of 40 MHz, the former sequence produces a transmitted pulse centered at 5 MHz and the latter sequence produces a transmitted pulse centered at 10 MHz. The appropriate base sequence can be selected depending on the operating characteristics of the transducer and the desired point spread function.

The transmitted waveform is generated by exciting each transducer element 12 with a sequence of regularly spaced bipolar pulses, as shown in FIG. 9. This pulse sequence is specified by a sequence of +1's and −1's stored in transmit memory 38 and provided to bipolar pulser 28'. Although FIG. 9 depicts a transmit memory storing only eight samples, in practice the transmit memory will store 64, 128 or more samples read out at a sampling rate of, e.g., 40 MHz. For a Golay code pair [+1,+1] and [+1, −1] and a base sequence of [−1,+1,+1,−1], the following Golay-encoded base sequence A* would be stored in the transmit memory for the first firing: [−1,+1,+1,−1,−1,+1,+1,−1]. For the second firing, the following Golay-encoded base sequence B* would be stored in the transmit memory: [−1,+1,+1,−1,+1,−1,−1,+1].

For each beam in a deep transmit focal zone, sequence A* is transmitted first. Then the echo signal from the first firing is digitized, beamsummed, filtered and stored in buffer memory 46 (see FIG. 3). Subsequently, sequence B* is transmitted and its echo signal is similarly processed. The two beamsummed signals are filtered to correlate each signal with its respective oversampled Golay sequence (A and B in FIGS. 5 and 7, respectively). FIR filter 44, shown in FIG. 3, performs the correlation:

$$x(n) * \overline{y(-n)} = \sum_m x(m+n)\overline{y(m)}$$

where * denotes convolution and the overbar denotes conjugation (if x and y are complex). The results of the correlations are summed in buffer memory 46 to form the decoded signal, which is supplied to the B-mode processor (not shown) for further processing. Except for improved SNR, the decoded Golay pulse is virtually the same as that obtained by transmitting the base sequence instead of the Golay-encoded base sequence.

A major advantage of the Golay code lies in its use of a bipolar pulser for code transmission versus the more expensive digital-to-analog converter that is required to transmit other codes such as the apodized chirp. In addition, the Golay code theoretically has no range lobes, which is not true of any other code.

The imaging system of the invention can also operate by demodulating the RF echo signals to baseband and downsampling before or after the beamsum. In this instance, the oversampled Golay sequences A and B that are stored for correlation would also be demodulated to baseband and downsampled.

While only certain preferred features of the invention have been illustrated and described herein, many modifications and changes will be apparent to those skilled in the art. For example, the invention is not limited to using biphase codes; polyphase codes can alternatively be used. In addition, it will be apparent that Golay coding can be performed on separate receive subapertures to reduce the effects of dynamic focusing. For example, a receive aperture can be divided into two or more subapertures for a single transmit event. The subapertures can be different for the two transmit events provided that the overall receive aperture is the same. For each transmit event the receive signals are beamformed for each subaperture, the beamformed signals for the respective subapertures are filtered, and the filtered signals of the respective subapertures are summed. It is, therefore, to be understood that the appended claims are intended to cover all such modifications and changes as fall within the true spirit of the invention.

What is claimed is:

1. An imaging system comprising:

a transducer array including a multiplicity of transducer elements for transmitting wave energy in response to electrical activation and transducing returned wave energy into electrical signals;

a transmitter coupled to said transducer array and programmed to activate a plurality of said transducer elements to transmit focused wave energy encoded with a first Golay code of a Golay code pair during a first transmit event and to transmit focused wave energy encoded with a second Golay code of said Golay code pair during a second transmit event;

a receiver programmed to respectively form first and second receive signals from electrical signals supplied from said plurality of transducer elements subsequent to said first and second transmit events respectively;

a filter programmed to filter said first and second receive signals as a function of said first and second Golay codes respectively to form first and second filtered signals respectively;

a summer for adding said first and second filtered signals to form a decoded signal; and a subsystem for displaying an image having an image portion which is a function of said decoded signal.

2. The system as recited in claim 1, wherein said transmitter is programmed to activate said plurality of transducer elements to transmit first and second transmit beams of wave energy during said first and second transmit events respectively, said first and second transmit beams being focused at the same focal position relative to said transducer array.

3. The system as recited in claim 1, wherein each of said plurality of transducer elements is adapted to be activated by a first pulse sequence encoded in accordance with an oversampled version of said first Golay code for said first transmit event and by a second pulse sequence encoded in accordance with an oversampled version of said second Golay code for said second transmit event.

4. The system as recited in claim 3, wherein said transmitter comprises a multiplicity of bipolar pulsers and a transmit sequence memory, said bipolar pulsers being adapted to provide said first pulse sequence to said plurality of transducer elements in accordance with a first Golay-encoded base sequence stored in said transmit sequence memory and to provide said second pulse sequence to said plurality of transducer elements in accordance with a second Golay-encoded base sequence stored in said transmit sequence memory.

5. The system as recited in claim 1, wherein said filter comprises a correlation filter having inputs for receiving a set of filter taps and a filter memory for storing first and second sets of filter taps for provision to said correlation filter, said first and second sets of filter taps being a function of said first and second Golay codes respectively.

6. The system as recited in claim 1, wherein said subsystem comprises:

a processing subsystem programmed to form an image signal from said decoded signal; and a display subsystem programmed to display an image having an image portion which is a function of said image signal.

7. The system as recited in claim 1, wherein said transducer elements comprise piezoelectric elements for transmitting ultrasound waves in response to electrical activation and for transducing returned ultrasound waves into electrical signals.

8. An imaging system comprising:

a transducer array including a multiplicity of transducer elements for transmitting wave energy in response to electrical activation and transducing returned wave energy into electrical signals;

a display monitor for displaying an image having an image portion which is a function of an image signal; and a data processor programmed to:

(a) activate a plurality of said transducer elements to transmit focused wave energy encoded with a first Golay code of a Golay code pair during a first transmit event and to transmit focused wave energy encoded with a second Golay code of said Golay code pair during a second transmit event;

(b) form first and second receive signals from electrical signals supplied from said plurality of transducer elements subsequent to said first and second transmit events respectively;

(c) filter said first and second receive signals as a function of said first and second Golay codes respectively to form first and second filtered signals respectively;

(d) add said first and second filtered signals to form a decoded signal;

(e) form an image signal from said decoded signal; and (f) send said image signal to said display monitor.

9. The system as recited in claim 8, wherein said computer is programmed to activate said plurality of transducer elements to transmit first and second transmit beams of wave energy during said first and second transmit events respectively, said first and second transmit beams being focused at the same focal position relative to said transducer array.

10. The system as recited in claim 8, wherein each of said plurality of transducer elements is adapted to be activated by a first pulse sequence encoded in accordance with an oversampled version of said first Golay code for said first transmit event and by a second pulse sequence encoded in accordance with an oversampled version of said second Golay code for said second transmit event.

11. The system as recited in claim 10, wherein said computer comprises a multiplicity of bipolar pulsers and a transmit sequence memory, said bipolar pulsers being adapted to provide said first pulse sequence to said plurality of transducer elements in accordance with a first Golay-encoded base sequence stored in said transmit sequence memory and to provide said second pulse sequence to said plurality of transducer elements in accordance with a second Golay-encoded base sequence stored in said transmit sequence memory.

12. The system as recited in claim 8, wherein said computer comprises a correlation filter having inputs for receiving a set of filter taps and a filter memory for storing first and second sets of filter taps for provision to said correlation filter, said first and second sets of filter taps being a function of said first and second Golay codes respectively.

13. The system as recited in claim 8, wherein said transducer elements comprise piezoelectric elements for transmitting ultrasound waves in response to electrical activation and for transducing returned ultrasound waves into electrical signals.

14. A system for transmitting ultrasound energy into an acoustic medium and receiving ultrasound energy returned from the acoustic medium subsequent to transmission comprising:
an ultrasound transducer array including a multiplicity of transducer elements for transducing ultrasound energy into electrical energy and for transducing electrical energy into ultrasound energy;
a transmitter coupled to said transducer array when in a transmit mode and programmed to activate a plurality of said transducer elements to transmit focused ultrasound energy encoded with a first Golay code of a Golay code pair during a first transmit event and to transmit focused ultrasound energy encoded with a second Golay code of said Golay code pair during a second transmit event subsequent to said first transmit event;
a receiver coupled to said transducer array when in a receive mode and programmed to form first and second beamsummed receive signals from electrical signals supplied from said plurality of transducer elements subsequent to said first and second transmit events respectively;
a filter programmed to filter said first and second beamsummed receive signals as a function of said first and second Golay codes respectively to form first and second filtered signals respectively; and
a summer for adding said first and second filtered signals to form a decoded signal.

15. The system as recited in claim 14, further comprising a subsystem for displaying an image having an image portion which is a function of said decoded signal.

16. The system as recited in claim 14, wherein said transmitter is programmed to activate said plurality of transducer elements to transmit first and second ultrasound beams during said first and second transmit events respectively, said first and second ultrasound beams being focused at the same focal position relative to said ultrasound transducer.

17. The system as recited in claim 14, wherein each of said plurality of transducer elements is adapted to be activated by a first pulse sequence encoded in accordance with an oversampled version of said first Golay code for said first transmit event and by a second pulse sequence encoded in accordance with an oversampled version of said second Golay code for said second transmit event.

18. The system as recited in claim 17, wherein said transmitter comprises a multiplicity of bipolar pulsers and a transmit sequence memory, said bipolar pulsers being adapted to provide said first pulse sequence to said plurality of transducer elements in accordance with a first Golay-encoded base sequence stored in said transmit sequence memory and to provide said second pulse sequence to said plurality of transducer elements in accordance with a second Golay-encoded base sequence stored in said transmit sequence memory.

19. The system as recited in claim 14, wherein said filter comprises a correlation filter having inputs for receiving a set of filter taps and a filter memory for storing first and second sets of filter taps for provision to said correlation filter, said first and second sets of filter taps being a function of said first and second Golay codes respectively.

20. A transmission and reception system comprising:
a transducer array including a multiplicity of transducer elements for transducing wave energy into electrical energy and for transducing electrical energy into wave energy;
a transmitter coupled to said transducer array when in a transmit mode and programmed to activate a plurality of transducer elements to transmit focused wave energy encoded with a first Golay code of a Golay code pair during a first transmit event and to transmit focused wave energy encoded with a second Golay code of said Golay code pair during a second transmit event subsequent to said first transmit event;
a receiver coupled to said transducer array when in a receive mode and programmed to form first and second beamsummed receive signals from electrical signals supplied from said plurality of transducer elements subsequent to said first and second transmit events respectively;
a filter programmed to filter said first and second beamsummed receive signals as a function of said first and second Golay codes respectively to form first and second filtered signals respectively; and
a summer for adding said first and second filtered signals to form a decoded signal.

21. A method of operating an imaging system comprising a multiplicity of transducer elements for transmitting wave energy in response to electrical activation and transducing returned wave energy into electrical signals, and a display monitor for displaying an image having an image portion which is a function of an image signal, said method comprising the steps of:
(a) activating a plurality of said transducer elements to transmit focused wave energy encoded with a first Golay code of a Golay code pair during a first transmit event and to transmit focused wave energy encoded with a second Golay code of said Golay code pair during a second transmit event;
(b) forming first and second receive signals from electrical signals supplied from said plurality of transducer elements subsequent to said first and second transmit events respectively;
(c) filtering said first and second receive signals as a function of said first and second Golay codes respectively to form first and second filtered signals respectively;
(d) adding said first and second filtered signals to form a decoded signal;
(e) forming an image signal from said decoded signal; and
(f) sending said image signal to said display monitor.

22. A method of imaging a medium, comprising the steps of:
transmitting focused wave energy encoded with a first Golay code of a Golay code pair into a medium during a first transmit event;
transducing wave energy returned from the medium after the first transmit event into a first set of electrical receive signals following said first transmit event;
beamforming said first set of electrical receive signals to form a first beamsummed signal;
filtering said first beamsummed signals as a function of said first Golay code to form a first filtered signal;
transmitting focused wave energy encoded with a second Golay code of said Golay code pair during a second transmit event;

transducing wave energy returned from the medium after the second transmit event into a second set of electrical receive signals following said second transmit event;

beamforming said second set of electrical receive signals to form a second beamsummed signal;

filtering said second beamsummed signal as a function of said second Golay code to form a second filtered signal;

adding said first and second filtered signals to form a decoded signal;

forming an image signal from said decoded signal; and displaying an image having an image portion which is a function of said image signal.

* * * * *